3,486,202
SNAP-IN FASTENER
John F. Nelson, Des Plaines, Ill., assignor to Illinois Tool Works Inc., Chicago, Ill., a corporation of Delaware
Filed May 16, 1968, Ser. No. 729,777
Int. Cl. A44b 21/00
U.S. Cl. 24—73                                8 Claims

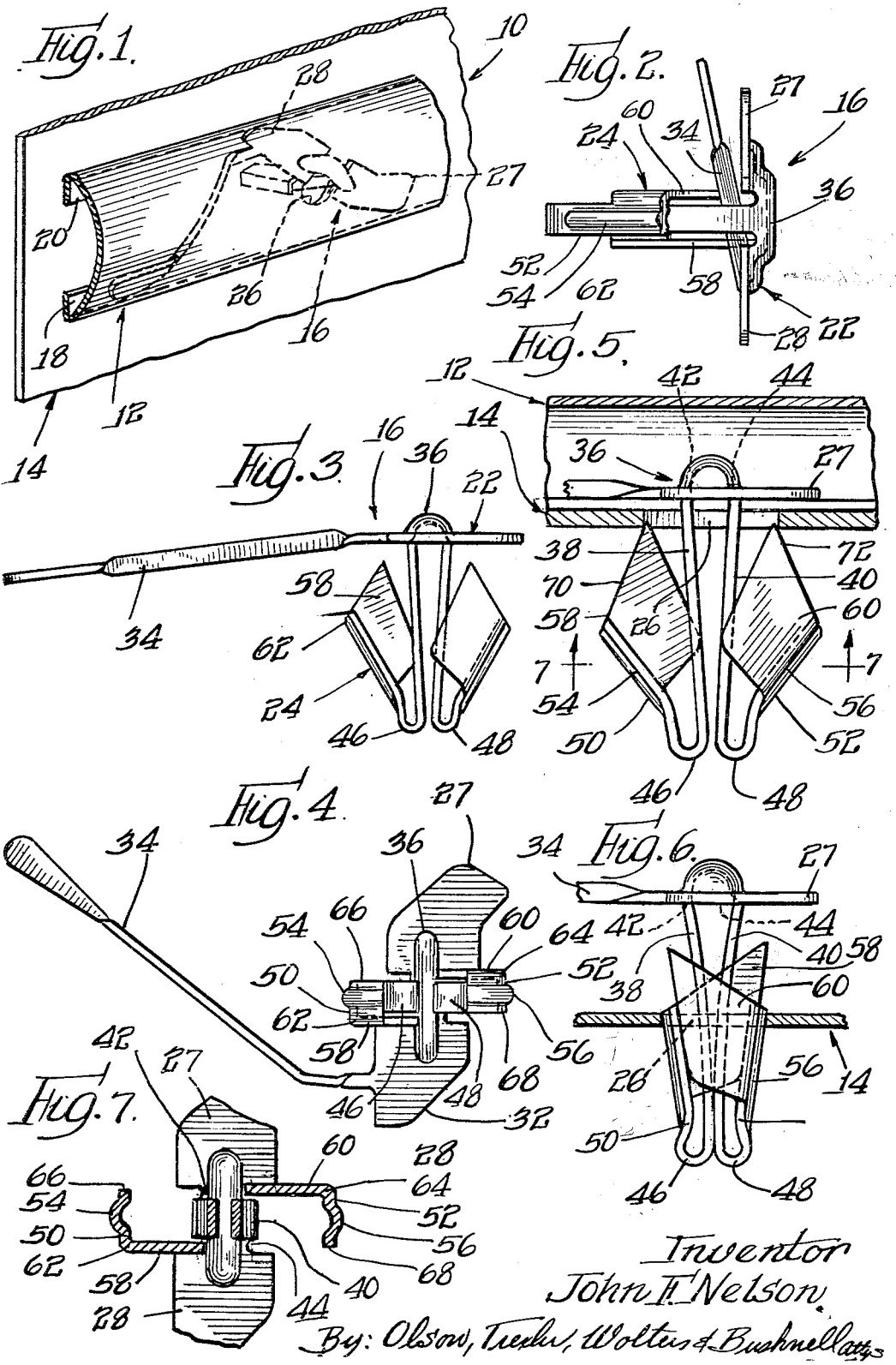

ABSTRACT OF THE DISCLOSURE

There is disclosed a sheet metal fastener having a head for retaining a molding strip and a shank insertable through a workpiece aperture and including a pair of adjacent axially extending legs. The legs have reversely bent and outwardly flaring resilient end portions each of which has a flange integral with a side edge thereof and projecting inwardly toward the other leg end portion. The flanges present end edges for engaging behind the workpiece and they are offset from each other and from the leg sections so that the end portion may be flexed inwardly sufficiently to enable the flanges to overlap each other during the assembly of the device with the workpiece whereby relatively large dimensional variations of the workpiece aperture may be accommodated.

---

The present invention relates to a novel snap-in fastener, and more specifically to a novel fastener adapted to be applied to an apertured workpiece.

It is to be understood that certain features of the present invention may be incorporated in fasteners adapted to secure a variety of different devices. For the purpose of illustrating one embodiment of the present invention, there will be shown and described herein a fastener which is particularly suitable for securing a device such as a molding strip with respect to an apertured workpiece such as an automobile panel. Fasteners of the type contemplated herein comprise a head portion adapted to engage and retain a device such as a molding strip and a shank portion which is adapted to be inserted or snapped through an aperture in a workpiece. Dimensions of such workpiece apertures and the thickness of the workpiece vary widely in different installations and even in the same installation so that it has frequently been necessary to maintain inventories of fasteners in different sizes.

It is an important object of the present invention to provide a novel fastening device of the above described general type which is capable of installation in workpieces having relatively wide variations in thickness and in dimensions of the apertures which receive the shank portion of the fastener.

A more specific object of the present invention is to provide a novel snap-in fastener having collapsible portions insertable through a workpiece aperture and constructed for permitting a relatively large variation in transverse dimensions when fully collapsed and when fully expanded for accomodating relatively wide variations in the dimensions of apertures in workpieces with which the fastener is to be assembled.

A still further specific object of the present invention is to provide a novel fastener of the above described type which is adapted to be formed economically from sheet material and is of rugged and reliable construction.

A still further specific object of the present invention is to provide a novel snap-in fastener or a molding clip of the above described type having a head portion engageable with a molding strip to be secured to an apertured workpiece and a shank portion having generally axially extending leg sections terminating in reversely bent and oppositely flaring end portions having abutment elements or flanges engageable beneath the workpiece, which flanges extend from diametrically opposite side edges of the end portions in a manner preventing interference therebetween and with other elements of the fastener when the shank portion is collapsed during insertion thereof through the workpiece aperture.

Other objects and advantages of the present invention will become apparent from the following description and the accompanying drawings wherein:

FIG. 1 is a fragmentary perspective view showing a molding strip mounted on an apertured workpiece or panel by means of a fastener incorporating features of the present invention;

FIG. 2 is a side elevational view of a fastener incorporating features of the present invention;

FIG. 3 is another side elevational view of the fastener turned 90° from the position shown in FIG. 2;

FIG. 4 is an entering end view of a fastener incorporating features of the present invention;

FIG. 5 is a fragmentary enlarged view showing the fastener fully assembled with an apertured workpiece;

FIG. 6 is a view similar to FIG. 5 but shows the fastener partially assembled with the apertured workpiece and the manner in which the shank portion is adapted to collapse; and FIG. 7 is a fragmentary sectional view taken generally along line 7—7 in FIG. 5.

Referring now more specifically to the drawings wherein like parts are designated by the same numerals throughout the various figures, an installation 10 is shown in FIG. 1 which includes a molding strip 12 secured to an apertured panel or workpiece 14 by a fastener 16 incorporating features of the present invention. As will be understood the molding strip 12 may be of a variety of designs and shapes having inturned flanges 18 and 20 cooperable with the fastener. The workpiece or panel 14 may comprise a part of many different types of machines or equipment such as automobiles, appliances and the like.

The fastener 16 is formed in one piece. Preferably the fastener is formed from sheet material such as resilient sheet metal or steel. The fastener has a head portion 22 adapted to cooperate with the molding strip and a shank portion 24 which is insertable through an aperture 26 in the workpiece or panel 14.

In the embodiment shown, the head portion 22 has oppositely extending substantially coplanar sections 27 and 28 respectively adapted to overlie the inturned flanges 18 and 20 of the molding strip. These sections have oppositely beveled edges 30 and 32 engageable with interior side walls of the molding strip and the fastener is adapted to be turned within the strip until such engagement occurs whereby molding strips of different widths may be accommodated. An elongated spring finger 34 is integrally connected to the section 28 adjacent an outer end thereof. The spring finger is adapted to be reversely bent in the manner indicated in FIG. 1 for biasing the fastener in a clockwise direction as viewed in that figure and thus maintaining the edges 30 and 32 in engagement with the interior of the molding strip.

The oppositely extending generally flat head sections 27 and 28 are integrally joined by a bight section 36. This section is in the form of an embossed rib having an inverted generally U-shaped transverse configuration. Opposite ends of the rib taper gradually into mid portions of the head sections 27 and 28 so that a strong rigid connection is provided therebetween.

The shank portion 24 comprises a pair of generally axially extending elongated leg sections 38 and 40 integrally joined with and depending from downwardly facing edges 42 and 44 of the U-shaped bight section 36. The U-shaped configuration of the rib section 36 enables upper ends of the leg sections 38 and 40 to be positioned in rather narrowly spaced apart relationship.

The leg sections extend from their upper ends gradually toward each other into nearly abutting but still spaced relationship. Each of the leg sections is formed with reversely bent end portions 50 and 52 extending back from U-shaped connecting sections 46 and 48 toward the head portion and then flaring outwardly in opposite directions as shown best in FIGS. 3 and 5. These end portions respectively have longitudinally extending centrally located embossed ribs 54 and 56 imparting strength and rigidity thereto. However, the ribs terminate short of the sections 46 and 48 so that the end portions are adapted to flex in the manner described below at their junctions with the remainder of the leg sections.

As previously indicated, the shank portion is adapted to be inserted through an apertured workpiece. In order to retain the fastener in assembled relationship with a workpiece, abutment elements or flanges 58 and 60 are integrally formed with the end portions 50 and 52 for engaging the back or underneath side of the workpiece as indicated in FIG. 5. More specifically, the abutment element or flange 58 is integrally joined to a side edge 62 of the end portion 50. The flange or abutment element 60 is similarly integrally joined to a diametrically opposite side edge 64 of the end portion 52. A side edge 66 of the end portion 50 opposite from the side edge 62 is free as indicated best in FIGS. 4 and 7. The corresponding but diametrically opposite side edge 68 of the end portion 52 is also free. Furthermore, FIGS. 4 and 7 clearly show that the flange or abutment element 58 is slightly offset from the side edges of the leg sections 38 and 40 and the flange or abutment element 60 is similarly offset in an opposite direction from the opposite side edges of the leg sections. This prevents the flanges or abutment elements from interfering with any other part of the fastener when the shank portion is collapsed during insertion through the workpiece aperture as described below.

As indicated in FIG. 5, the abutment or flange elements have beveled end surfaces 70 and 72 engageable beneath the workpiece 14 when the fastener is fully assembled. The diameter of the workpiece aperture 26 is, of course, less than the largest distance between radially outer ends of the beveled abutment surfaces 70 and 72 so as to insure engagement of these surfaces beneath the workpiece. The dimension of the workpiece aperture and thickness may be different in different workpieces, but the beveled and outwardly flaring arrangement of the abutment edges or surfaces 70 and 72 enables the device to accommodate wide variations in such dimensions.

During initial insertion of the shank portion through the workpiece aperture 26, opposite edges of the aperture engage the outer surfaces of the end portions 50 and 52 so that these end portions are flexed inwardly or collapsed as shown in FIG. 6. This figure further shows the manner in which the shank portion can be collapsed with the abutment or flange elements 58 and 60 overlapping both leg sections and each other without interference. In other words, the shank portion may be collapsed sufficiently to be inserted through workpiece apertures having a relatively small diameter while at the same time the structure of the fastener enables it to be used with workpieces having relatively large diameter apertures.

While a perferred embodiment of the present invention has been shown and described herein, it is obvious that many structural details may be changed.

The invention is claimed as follows:

1. A fastener adapted to be applied to a workpiece having an aperture therethrough comprising a head portion for overlying the workpiece, an integral shank portion insertable through said aperture, said shank portion including a pair of leg sections extending generally axially from said head portion in side by side relationship, said leg sections including reversely bent end portions flaring outwardly and generally back toward said head portion and being resiliently collapsible toward each other to permit passage through the workpiece aperture during assembly of the fastener with the workpiece, said end portions respectively having oppositely disposed first side edges and oppositely disposed second side edges, and abutment elements respectively integral with certain of said side edges and laterally offset with respect to each other and with the remainder of said leg sections and presenting surfaces for engaging behind the workpiece when the shank portion is inserted through the workpiece aperture, said end portions being resiliently collapsible during such insertion to position the abutment elements in overlapping relationship with each other and with said leg sections without interference for enabling the abutment elements to be positioned beneath the workpiece.

2. A fastener, as defined in claim 1, wherein said abutment elements consist of a first abutment element integral with said first side edge of one of said end portions and a second abutment element integral with said second side edge of the other of said end portions.

3. A fastener, as defined in claim 2, wherein said abutment elements comprise flanges extending from their respective end portions generally toward and laterally offset from said leg sections.

4. A fastener, as defined in claim 3, wherein said flanges have oppositely diverging end edges engageable with the workpiece when the fastener is fully assembled with the workpiece.

5. A fastener, as defined in claim 1, wherein said head portion comprises opposite end sections engageable with a member to be fastened with respect to said workpiece, and a bight portion extending between and integrally joining said opposite end sections, said bight portion having a generally U-shaped cross-sectional configuration, and said leg sections respectively being integral with and extending from edges of the U-shaped bight portion.

6. A fastener, as defined in claim 5, wherein said end portions of said leg sections include arcuate segments joining the end portions to the remainder of the leg sections, said arcuate segments being resiliently collapsible, and rib means integral with and extending longitudinally of the remainder of said end portions for resisting flexing in the remainder of said end portions.

7. A fastener, as defined in claim 6, wherein said abutment elements comprise flanges extending from said end portions generally toward and laterally offset outwardly of the remainder of said leg sections.

8. A fastener, as defined in claim 7, wherein said flanges consist of a first flange integral with the first side edge of one of said end portions and a second flange integral with the second side edge of the other of said end portions, the other side edges of both of said end portions being free.

References Cited

UNITED STATES PATENTS

| 2,885,754 | 5/1959 | Munse | 24—73 |
| 2,961,723 | 11/1960 | Hamman | 52—718 XR |
| 3,205,546 | 9/1965 | Nelson. | |

DONALD A. GRIFFIN, Primary Examiner